United States Patent [19]
Richter et al.

[11] 3,940,049
[45] Feb. 24, 1976

[54] PROCESS FOR WELDING EXPLOSIVE-CLAD METAL SHEETS

[75] Inventors: Ulf Richter, Burbach-Wurgendorf; Antonius Korves, Ahlen, Westphalia, both of Germany

[73] Assignees: Dynamit Nobel Aktiengesellschaft; Jacob and Korves GmbH, both of Germany

[22] Filed: May 31, 1973

[21] Appl. No.: 365,407

[30] Foreign Application Priority Data
May 31, 1972   Germany............................ 2226484

[52] U.S. Cl.................................. 228/107; 228/136
[51] Int. Cl.²................................................ B23K 31/02
[58] Field of Search .... 29/470, 470.9, 471.1, 471.7, 29/472.1, 472.3, 482, 483, 488, 490; 228/107, 135, 136, 164

[56] References Cited
UNITED STATES PATENTS

| | | | |
|---|---|---|---|
| 2,050,326 | 8/1936 | Hopkins........................ | 29/471.7 X |
| 2,148,427 | 2/1939 | Howard et al. ..................... | 29/471.1 |
| 2,158,799 | 5/1939 | Larson............................ | 29/471.1 X |
| 2,943,387 | 7/1960 | Dawson .......................... | 29/483 X |
| 3,443,306 | 5/1969 | Meyer............................... | 29/471.7 |
| 3,449,819 | 6/1969 | Blank................................ | 29/470.9 |
| 3,482,304 | 12/1969 | Brigot et al....................... | 29/471.1 |
| 3,489,446 | 1/1970 | Williams......................... | 29/471.1 X |
| 3,629,932 | 12/1971 | Richter.............................. | 29/472.1 |
| 3,735,476 | 10/1974 | Deribas et al..................... | 29/470.1 |

Primary Examiner—Gerald A. Dost
Attorney, Agent, or Firm—Craig & Antonelli

[57] ABSTRACT

A process for welding explosive-clad metal sheets together with one another and/or with metal pipes, connecting elements, or the like, includes producing at least one unjoined zone between the base metal and the cladding metal in a defined manner during an explosive cladding step, and thereafter welding in the region of at least one of unjoined zones.

34 Claims, 8 Drawing Figures

PROCESS FOR WELDING EXPLOSIVE-CLAD METAL SHEETS

This invention relates to a process for welding explosive-clad metal sheets together with one another and/or with metal pipes, metal connecting elements or the like.

When using explosive-clad metal sheets in apparatus construction, certain difficulties are often encountered when welding the metal sheets together with one another and/or with pipes, connecting elements, or the like. This is true, in particular, if the two metals bonded by the explosive cladding method can form intermetallic compounds, as is the case, for example, that formed by aluminum, molybdenum, tantalum, titanium, niobium, tungsten, palladium, or zirconium with steel, or copper with aluminum. If the welding heat introduced into the bonding zone is too high, brittle intermetallic substances can be formed by diffusion and can lead to a detachment of the cladding layer at the locations affected by the heat. However, especially in case of minor cladding thicknesses of the cladding material, there is also the danger that, for example during fillet welding, the thin layer of cladding metal is made entirely molten throughout and thus portions of the base metal enter the weld seam. This results in brittleness of the weld seam and strongly reduces its corrosion resistance. Particularly great difficulties of this type occur in the welding of tantalum-steel or niobium-steel clad sheets. This is so because, with the tantalum cladding which is chosen to be maximally thin for economical reasons, there is the very grave danger, due to the strongly differing melting points of 3,000°C. for tantalum and 1,535°C. for steel, respectively, that the steel underneath the tantalum layer is melted or even vaporized.

In order to circumvent the aforementioned difficulties, numerous methods have already been proposed. For example, it is known to remove along the intended welding edge of each explosive-clad metal sheet, the base metal in a narrow zone directly down to the cladding metal metallically bonded to the base metal; then to weld the projecting edges of the cladding metal together; to introduce, as a root layer, a third metal compatible with both cladding metals; and to close the remaining welding gap with layers of the base metal. In accordance with U.S. Pat. No. 3,629,932, wherein the weld seam is prepared in the same way, the provision is made to insert, in place of the root layers of a third metal, an explosive-clad metallic strip made from the two cladding metals, and then to weld together the base metal and the cladding metal independently of each other.

However, the conventional processes have the disadvantage that the preparation of the weld seam is very complicated, and maximum accuracy must be observed in the milling, lathing, or the like of the grooves between the metal sheets to be welded together; this is so, because, on the one hand, not too much material must be removed from the cladding metal--the layer thickness of which is often only 0.5 – 2mm. -- but, on the other hand, no traces of the base metal may remain on the cladding metal, since otherwise during welding a dangerous brittleness of the seam would occur. This accurate removal or dressing off of the base metal is particularly difficult, because in practice the clad metal sheets are not ideally planar in the majority of cases.

It is furthermore known to machine down the base metal at the edges of the clad metal sheet to be welded together until almost to the cladding metal, and then to remove the remainder of the base metal by etching. Apart from the fact that here again the expense for preparing the seam is inordinately high, this process has the further disadvantage that, although the etching bath completely removes the residues of base metal from the underside of the cladding metal, the point-like intermetallic compound inclusions in the bonding zone between the base and cladding metals, which are also present in explosive claddings of, for example, steel and tantalum, are not entirely eliminated. However, in such a case, traces of the base metal enter the weld seam during the welding of the edges of the cladding metal. This, in turn -- as mentioned above -- results in a brittleness of the weld seam and strongly reduces its corrosion resistance.

This invention is directed to the problem of avoiding the disadvantages of the conventional processes for the welding together of explosive-clad metal sheets with one another and/or with pipes, connecting pieces, or the like.

This problem is solved, in accordance with this invention, by producing, in the explosive cladding process, unjoined (i.e. unconnected, or non-joined) zones between the base metal and the cladding metal in a defined manner and conducting the subsequent welding procedure in the regions provided by these unjoined zones. Thus, the weld seam preparation to be done subsequently is considered during the initial explosive cladding, and this preparation is advantageously simplified, on the one hand, and rendered more reliable, on the other hand, in that, in the regions of the metal sheets to be welded, a metallic bond between the base metal and the cladding metal is purposely prevented, so that both metallic layers are clearly segregated in the welding area and thus can be flawlessly welded together individually.

These intended unjoined zones in the explosive-clad metal sheets can be obtained, for example, by providing the base metal sheet with the approximate dimensions of the clad metal sheet, but making the cladding metal sheet somewhat larger, e.g. either longer or wider, at the area corresponding to the subsequent welding regions, so that the cladding metal sheet laterally projects for a certain length (or width) beyond the base metal sheet along an edge thereof. By limiting the explosive layer on the topside of the cladding metal sheet to the area of the base metal disposed thereunder, i.e. by keeping the strip of cladding metal projecting beyond the base metal free of explosive, the regions subsequently to be welded together are exempted from the cladding effect. The laterally projecting strip of the cladding metal thus is not bonded to the base metal, so that a flawless subsequent welding in the zone of this strip is ensured. This procedure, moreover, offers the additional advantage that no base metal is disposed under the region of the cladding metal to be welded together subsequently, and thus there is no need for removing the base metal thereafter, for example by a cutting operation.

Depending on the conditions in each individual case, determined, for example, by the properties of the base and cladding metals employed, the thickness of the metals to be bonded by cladding, the type and amount of the explosive, the laterally projecting strip of cladding metal at the edges of the base metal can be damaged or even sheared off in a mode of operation according to the above-described process. If this danger of damage or severing of the projecting strip of cladding metal exists, another advantageous embodiment of this invention provides that the cladding metal, which is provided with a layer of explosive while leaving the areas adjacent to the intended unjoined zones vacant (i.e. free of explosive) is dimensioned and arranged so that is contacts the base metal, after the explosive cladding step, with its entire surface area, and that, prior to welding, the base metal is machined down in the region of the unjoined zones. In this case, the cladding metal is supported in its entire surface area on the base metal sheet during the cladding process, and is metallically bonded to the base metal except in the unjoined zones; whereas, in the projecting areas which are to be welded later, the cladding metal, on the one hand, has not entered into a bond with the base metal due to the missing or omitted coat of explosive, and, on the other hand, has not been unduly deformed or damaged.

Insofar as it is possible, in individual cases, when carrying out the above procedure, that, during the impacting of the edge of the cladding metal, which is without a layer of explosive, against the base metal, traces of the base metal adhere to the unjoined edge of the cladding metal and exert a disadvantageous effect on the subsequent welding operation, it proves to be advantageous, in accordance with another embodiment of this invention, to provide the base metal and/or the cladding metal prior to the explosive cladding step with a separating agent or means for preventing the direct contact of the two metals, in the zone of the intended unjoined zones or locations. This ensures, on the one hand, in the region to be welded together subsequently, a clear segregation between the two metallic layers and, on the other hand, the flawless metallic bonding in the remaining area. A disadvantageous intermixing of the two metals during welding is thus reliably prevented.

A suitable separating means according to this invention is a metallic strip of a minor thickness which is removed, e.g. by melting after the explosive cladding step. The melting out process is preferably conducted in a furnace under an atmosphere of a protective gas, e.g. argon, or in vacuum. In order to avoid the formation of undesired intermetallic compounds between the separating agent and the cladding metal, a metal is to be selected for the separating means which has a sufficiently low melting point and accordingly a low melting out temperature. Furthermore, in order to prevent the formation of intermetallic compounds, it can be advantageous to apply the metal used as the separating means directly to the cladding metal by galvanic, chemical, or other suitable methods so that during the explosive cladding -- which presupposes a certain distance between the materials to be clad -- a metallic bond takes place only between the base metal and the separating means. However, in such a case, any intermetallic compounds formed do not interfere, since they are removed during the preparation of the weld seam together with the base metal by the machining down procedure. Examples for suitable separating agents for tantalum-steel claddings are tin or Wood's alloy (a low-melting-point alloy, i.e. 65.5°C. of 5 parts Bi, 2.5 parts of Pb, 1.25 parts Sn and 1.25 parts Cd).

However, in view of a maximally low manufacturing expenditure, it proves generally advantageous, in accordance with a further embodiment of this invention, to use as the separating means a thin layer of wax, a viscous fat, paper, a synthetic resin, e.g. epoxy resin or polyurethane, a metallic oxide, e.g. $Al_2O_3$ and $Pb_2O_3$, silicate, e.g. sodium silicate and enamel glass, or similar substances. Thus, a viscous fat suitable in this connection is so-called vacuum grease and feasible synthetic resins can be, for example, a two-component adhesive having an epoxy resin base, spreadable varnishes, strips, and/or tapes of PVC or polyethylene, which can be placed thereon or glued thereon, for instance in the form of an adhesive tape, or also polytetrafluoroethylene which can be sprayed thereon. However, it is also possible to oxidize the base metal and/or the cladding metal proper in the area of the intended unjoined zones prior to the explosive cladding step, e.g. by electrolysis. Furthermore, it is basically likewise possible to employ foreign oxides, such as, e.g. aluminum oxide or zinc oxide in case of tantalum-steel claddings, which are sintered, for example, sufficiently firm to the base metal and/or the cladding metal or have been applied to the base metal by flame spraying. Suitable silicates are low-melting glasses, e.g. enamel glass which are applied in the molten condition. Also borax (i.e. a natural hydrated sodium borate), applied in the form of a melt, is suitable as a separating means. The residues of the separating agent which may still be present after the cladding step can be removed -- if they were to interfere during the welding operation -- previously, for example, by etching or, in case of wax, grease, paper, synthetic resin or the like as the separating agent, in a particularly simple way by brushing away or by dissolution in an organic solvent, e.g. methylene chloride or acetone.

The use of a special separating means or agent according to this invention affords moreover the further advantage that, according to another proposal of this invention, the explosive layer on the cladding metal can also be applied so that it covers the intended unjoined zones, whereby the application and arrangement of the explosive are substantially simplified. In this connection, the separating means prevents at the desired zones or locations the metallic bonding during the explosive cladding process, as required according to this invention.

The process of this invention cannot only be employed for weld seams at the outer margin of the cladded metal sheet, but also advantageously, for example, when pipes, connecting pieces, or perhaps so-called manholes for entering tanks, kettles, or the like are to be connected somewhere in the middle of the metal sheet by means of welding. Here, too, the intended unjoined zones can be produced in the manner heretofore described. Thus, basically, the base metal sheet can, for example, be provided with a cutout according to the outer contour of the pipe to be extended therethrough; the cladding metal sheet, having a correspondingly smaller cutout, projects inwardly beyond the rim of the base metal sheet for a certain length with its area which is to be welded together later. The explosive layer leaves the intended unjoined zone vacant. In order to ensure that the explosive detonates completely in a maximally satisfactory manner, however, it will generally be preferable to apply the explosive also to this unjoined zone. This also insures that a maximally uniform thickness will be obtained in the layer of the explosive coating. In this case, according to the invention, a thin layer of the separating means of a corresponding configuration and dimensions is then disposed between the base metal and the cladding metal sheets.

The remaining preparation and conductance of the explosive cladding process takes place in the same manner as if, according to the conventional methods, a metallic bond is desired on the entire surface. The ignition of the explosive can be initiated from one corner, a lateral edge, or also a point in the center of the explosive layer. After cladding, the zones of the cladding metal which are not bonded, in accordance with this invention, are bent upwardly if base metal is disposed thereunder, and the base metal is machined away to the extent necessary in the individual case by means of milling, sawing, burning, lathing, turning, or the like. Of course, in case of an unjoined zone in the center of the cladded sheet metal, the cladding metal must first be provided with a corresponding cutout by drilling, turning, milling, or the like, unless this cutout had already been formed prior to the cladding step. In these machining processes, a far lower accuracy is demanded than in the conventional preparation of a weld seam with a metallic bond between the base metal and the cladding metal.

The projecting edges of the cladding metal of two clad metal sheets can then be bent upwardly or downwardly and welded together by means of an edge weld. In the latter case, the bond can be further secured with an additional double-flanged seam in the angle formed between the two converging projecting edges of the cladding metal sheets. In both cases, it is advantageous in order to reinforce the seam to join the base metal of the two sheets by means of an outwardly welded-on tongue. However, instead, it is also possible when the edges of the cladding metal are bent upwardly, first to weld the base metal of both metal parts in a conventional manner, then to partially re-apply the cladding metal thereto, and then to weld same by means of an edge weld at the contacting edges. Likewise, the planar welding of the projecting edges of the cladding metal by a butt weld is possible, wherein the base metal side is subsequently also butt-welded in a conventional manner, for example with the use of an explosive-clad metal strip inserted between the parts.

The process of this invention will be further understood from the embodiments illustrated in the accompanying drawings and from the following detailed description wherein:

FIGS. 3 through 6 are, respectively, cross-sectional views showing various embodiments of the invention for forming a weld seam between the explosive-clad metal sheets alone or with another metal element.

Figure 1:
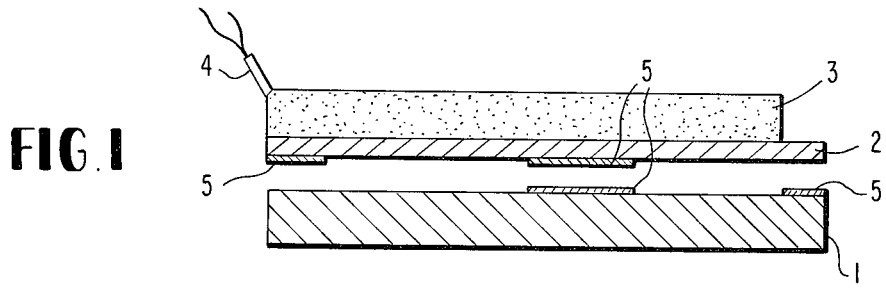
FIG. 1 is a cross-sectional view showing an arrangement for use in the invention prior to the explosive cladding step.

According to FIG. 1, a cladding metal 2, i.e. tantalum of 0.8 mm thickness with the explosive layer 3, i.e. Ammonit (an explosive containing ammonium nitrate and trinitrotoluene) of 12 mm thickness and an electric primer 4 is disposed at a predetermined spacing from the base metal 1, i.e. carbon steel, of 20 mm thickness. Between the base metal 1 and the cladding metal 2, the separating layers 5, each made of epoxy resin of 0.15 mm thickness, are provided to obtain defined unjoined zones. In order to illustrate the various basic aspects of this application, a separating means or layer 5 is provided, at the left-hand margin, on the cladding metal 2; in the center, on the base metal 1 as well as on the cladding metal 2; and, at the right-hand margin, only on the base metal 1. Of course, in a modification thereof, a separating layer 5 can, for example, be placed either only on the base metal 1 or only on the cladding metal 2. (Also less preferably the separating layer may be omitted and the intended unjoined zone can be formed by omitting the explosive from the area superjacent to these zones.) The explosive coating 3 covers, at the left-hand margin and in the middle, the intended unjoined zones, while these zones are left vacant from explosive at the right-hand margin of the arrangement.

Figure 2:
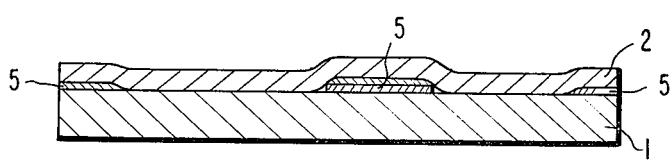
FIG. 2 is a cross-sectional view showing an explosive-clad metal sheet.

In FIG. 2, the resultant sheet metal is shown after the explosive cladding step. The separating layers 5 prevent a direct contact between the base metal 1 and the cladding metal 2 in the area of the intended unjoined zones so that, during the subsequent welding step, no disadvantageous metallic impurities need be feared or expected to occur in these zones.

Figures 3, 4A:
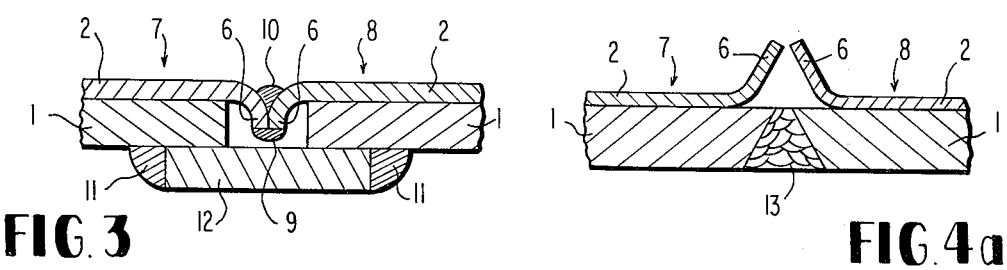

In the weld seam shown in FIG. 3, the projecting edges 6 of the cladding metals 2 of the two clad metal sheets 7 and 8 to be welded together are bent downwardly and are bonded by welding with the aid of the edge weld seam 9 formed of tantalum metal. It will be appreciated that the edges 6 had previously been made to project from each end of sheets 7 and 8 by removing an end portion of each of the base metal sheets adjacent to the unjoined zones by machining, e.g. grinding. Additionally, the double-flanged seam 10 is provided in the angle formed between the two bent projecting cladding metal plates 2. The base metal sheets 1 are joined by the tongue 12 welded on the outside by fillet weld seams 11, also of carbon steel metal.

Figures 3A, 6:
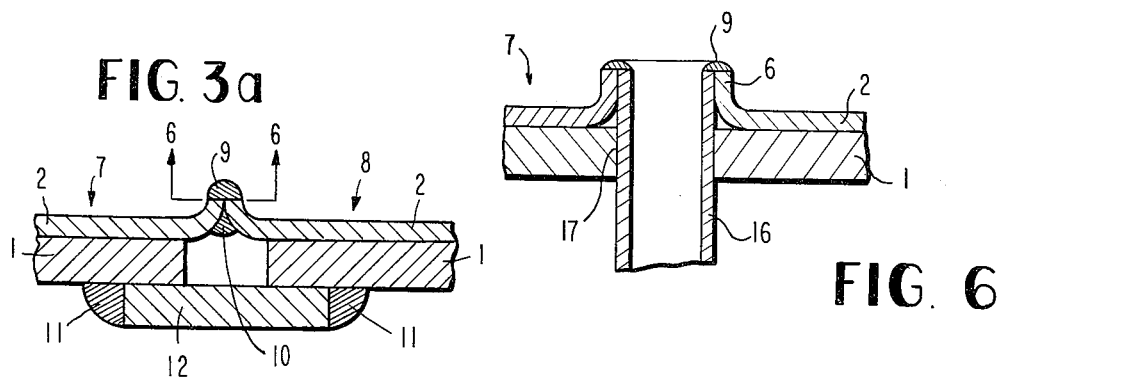

FIG. 3a illustrates a similar embodiment to FIG. 3 except that the edges 6 of the cladding metal sheets 7 and 8 are bent upwardly rather than downwardly.

FIG. 4a shows a different configuration of the weld seam wherein the end of base metals 1 of the two sheets 7 and 8 adjacent to the projecting edges 6 are butt-welded conventionally be means of the seam 13, with the edges 6 of the cladding metal sheets 2 being bent upwardly. Thereafter, the edges 6, according to FIG. 4b, are again partially pressed against the base metal sheets 1 and welded together with the aid of the edge seam 9.

Figures 4B, 5:
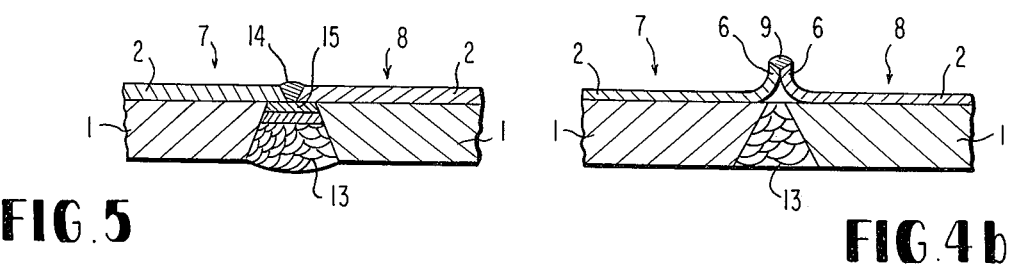

In accordance with FIG. 5, the two explosive clad metal sheets 7 and 8 are welded together at their edges. In this procedure, the cladding metal sheets 2 are welded together by a butt weld seam 14, and the base metal sheets 1 are welded together in a conventional manner with the use of an insert strip 15 made of tantalum on steel produced by explosive cladding and by the steel seam 13. The insert strip 15 can be produced by explosive cladding a layer of 2.5 mm tantalum on 2.5 mm carbon steel, flattening and cutting to strips of 12 to 20 mm width (according to U.S. Pat. No. 3,629,932).

In FIG. 6, finally, a connection of the explosive-clad sheet metal 7 with the pipe 16, having a circular shaped periphery, is illustrated. The pipe consists of the same material as the cladding metal 2, e.g. tantalum. The pipe 16 is extended through the opening 17 in the base metal sheet 1 and welded at its free end, by the edge seam 9, together with the upwardly bend edges 6 of the cladding metal sheet 2. The edges 6 are formed to welding by cutting out a circular section of the tantalum sheet, which has a diameter smaller than the opening 17, and then pushing with a piston steel the opening 17 from the stel side, thereby widening the cutout in the tantalum layer and bending the edges 6 upward.

While the novel embodiments of the invention have been described, it will be understood that various omissions, modifications and changes in these embodiments may be made by one skilled in the art without departing from the spirit and scope of the invention.

We claim:

1. In a process for joining an explosive-clad metal sheet composed of a base metal layer and a cladding metal layer to another element by welding, the improvement comprising carrying out explosive cladding to form said explosive-clad metal sheet in such a way that facing sections of said base metal layer and said cladding metal layer are unbonded in those portions of the explosive-clad metal sheet which will be welded to said element, and thereafter joining said element to the cladding metal layer of said explosive-clad metal sheet by welding only to portions of the cladding metal layer of said explosive-clad metal sheet in which said base metal layer and said cladding metal layer are unbonded.

2. The process of claim 1, wherein said explosive-clad metal sheet is formed by explosive cladding said cladding metal onto said base metal, said cladding metal layer contacting said base metal layer over the entire surface area of said base metal layer after explosive cladding, the unbonded portions of said base metal layer being removed by machining prior to welding.

3. The process of claim 1, wherein said explosive-clad metal sheet is formed by explosive cladding said cladding metal on said base metal layer, separating means being provided between said base metal and said cladding metal in the unbonded portions of the explosive-clad metal sheet during explosive cladding.

4. The process of claim 3, wherein said separating means is a metallic strip, said process further comprising removing said separating means after explosive cladding.

5. The process of claim 4, wherein said separating means is removed by melting.

6. The process of claim 3, wherein said separating means is a thin layer of a material selected from the group consisting of wax, a viscous fat, paper, a synthetic resin, a silicate and a metal oxide.

7. The process of claim 3, wherein the explosive coat coated on the cladding metal during explosive cladding covers the unbonded portions of the explosive-clad metal sheet.

8. The process of claim 1, wherein said element is an explosive-clad metal sheet, wherein the base metal layer and the cladding metal layer along at least a portion of one edge of each explosive-clad metal sheet are unbonded, wherein the unbonded cladding metal layers along said edges are bent outwardly from the planes of the respective explosive-clad metal sheets, wherein said explosive-clad metal sheets are arranged so that the outwardly bent cladding metal edges of each sheet are in abutment and the adjacent base metal layers of each sheet define a gap therebetween, wherein the abutting cladding metal layers of each metal sheet are welded together by an edge weld, and wherein the gap between the base metal layers of the two metal sheets is covered by a metal tongue welded onto the base metal layer of each metal sheet on the side facing away from the cladding metal.

9. The process of claim 8, wherein the unbonded base metal layer edges of each explosive-clad metal sheet are removed prior to welding the cladding metal layers together.

10. The process of claim 1, wherein said element is an explosive-clad metal sheet, wherein the base metal layer and the cladding metal layer along at least a portion of one edge of each explosive-clad metal sheet are unbonded with the unbonded cladding metal layer of each edge extending in the plane of the respective metal sheets past the base metal layer, wherein the portion of the cladding metal extending past the base metal layer is bent towards the plane of said base metal layer, wherein said explosive-clad metal sheets are arranged so that the bent portions of the cladding metal layers of each sheet abut together, wherein the bent cladding metal edges so abutted are welded together with an edge weld, and wherein the base metal layers of each sheet are covered by a metal tongue welded onto the base metal layers on the side of the explosive-clad metal sheets facing away from the cladding metal layers.

11. The process of claim 10, wherein the abutting edge-welding cladding metal layers of each sheet are further welded together on the opposite side of said edge weld with a double-flange seam provided in the angle formed between the two abutting edges of the cladding layers.

12. The process of claim 1, wherein said element is an explosive-clad metal sheet, wherein the base metal layer and the cladding metal layer along at least a portion of one edge of each explosive-clad metal sheet are unbonded, wherein the unbonded cladding metal layers along said edges are outwardly bent from the planes of the respective metal sheets, wherein said explosive-clad metal sheets are positioned so that the outwardly bent cladding metal edges of each explosive-clad metal sheet abut one another, wherein the base metal layers of the explosive-clad metal sheets are welded together by a butt weld seam, and wherein the abutting cladding metal edges are welded together with an edge weld.

13. The process of claim 12, wherein the unbonded base metal layer edges of each sheet are removed piror to welding.

14. The process of claim 12, wherein the abutting outwardly bent edges of the cladding metal layers of the two explosive-clad metal sheets are pressed partially against the base metal layers of the explosive-clad metal sheets prior to being welded together.

15. The process of claim 1, wherein said element is an explosive-clad metal sheet, wherein the base metal layer and the cladding metal layer along at least a portion of one edge of each explosive-clad metal sheet are unbonded, wherein the unbonded cladding metal layers along said edges are welded together by a butt weld seam, and wherein subsequently the unjoined base metal layers along said edges are butt-welded together.

16. The process of claim 15, wherein the unbonded base metal layers along said edges are removed prior to welding the cladding metal layers together.

17. The process of claim 15, wherein the base metal layers are butt-welded together with the use of an insert strip.

18. The process of claim 1, wherein said base metal layer includes an opening for receiving said element, wherein the cladding metal layer facing said opening is outwardly bent away from said opening, and wherein the outwardly bent cladding metal layer is joined to said element extending through said opening by an edge weld.

19. The process of claim 18, wherein said element is a pipe.

20. The process of claim 19, wherein said pipe is positioned perpendicular to said base metal layer.

21. The process of claim 1, wherein said base metal layer is carbon steel or stainless steel, and wherein said cladding metal layer is tantalum.

22. The process of claim 1, wherein unbonded facing sections of said base metal layer are removed prior to welding.

23. The process of claim 22, wherein said unbonded facing sections of said base metal layer are removed by machining.

24. The process of claim 22, wherein unbonded sections of said cladding metal layer corresponding to the sections of the base metal layer removed prior to welding are bent out of the plane of said cladding metal layer prior to welding.

25. The process of claim 22, further comprising welding bent out unbonded sections of said cladding metal layer.

26. The process of claim 25, wherein two explosive-clad metal sheets are secured together by welding together the respective unbonded sections of cladding metal layers of each explosive-clad metal sheet.

27. The process of claim 26, wherein the two explosive-clad metal sheets are arranged so that the cladding metal layer of each sheet faces the same direction.

28. The process of claim 27, further comprising welding together the base metal layers of the two explosive-clad metal sheets.

29. The process of claim 28, wherein the weld made between the two base metal sheets is out of contact with the weld made between the two cladding metal layers.

30. The process of claim 28, wherein the two base metal sheets are welded together by a tongue individually welded to the base metal layers of each sheet.

31. In a process for joining an explosive-clad metal sheet composed of a base metal layer and a cladding metal layer to another element by welding, the improvement comprising carrying out explosive cladding to form said explosive-clad metal sheet in such a way that facing sections of said base metal layer and said cladding metal layer are unbonded in at least one portion of the explosive-clad metal sheet which will be welded to said element, and thereafter joining said element by welding only to the portion of the cladding metal layer of said explosive-clad metal sheet in which said base metal layer and said cladding metal layer are unbonded.

32. The process of claim 31, wherein at least one unbonded facing section of said base metal layer is removed prior to welding.

33. The process of claim 31, wherein at least one unbonded section of said cladding metal layer corresponding to the at least one section of the base metal layer removed prior to welding is bent out of the plane of said cladding metal layer prior to welding.

34. The process of claim 31, wherein during explosive cladding said cladding metal layer is completely covered with an explosive layer except in an area corresponding to said at least one portion of the explosive-clad metal sheet which will be welded to said element.

* * * * *